W. B. Trunick,
Walking Beam for Well Borer.
No. 59,482. Patented Nov. 6, 1866.

Witnesses.

Inventor.
Wm B. Trunick.

UNITED STATES PATENT OFFICE.

W. B. TRUNICK, OF PITTSBURG, PENNSYLVANIA.

IMPROVED BORING-TOOL FOR WELLS.

Specification forming part of Letters Patent No. 59,482, dated November 6, 1866.

*To all whom it may concern:*

Be it known that I, W. B. TRUNICK, of the city of Pittsburg, in the county of Allegheny and State of Pennsylvania, have invented a new and Improved Self-Acting Boring-Tool-Turning Apparatus; and I do declare that the following is a full and exact description thereof, which will enable others skilled in the art to make and use the same, reference being had to the accompanying drawings, forming part of this specification, in which—

Figure 1:
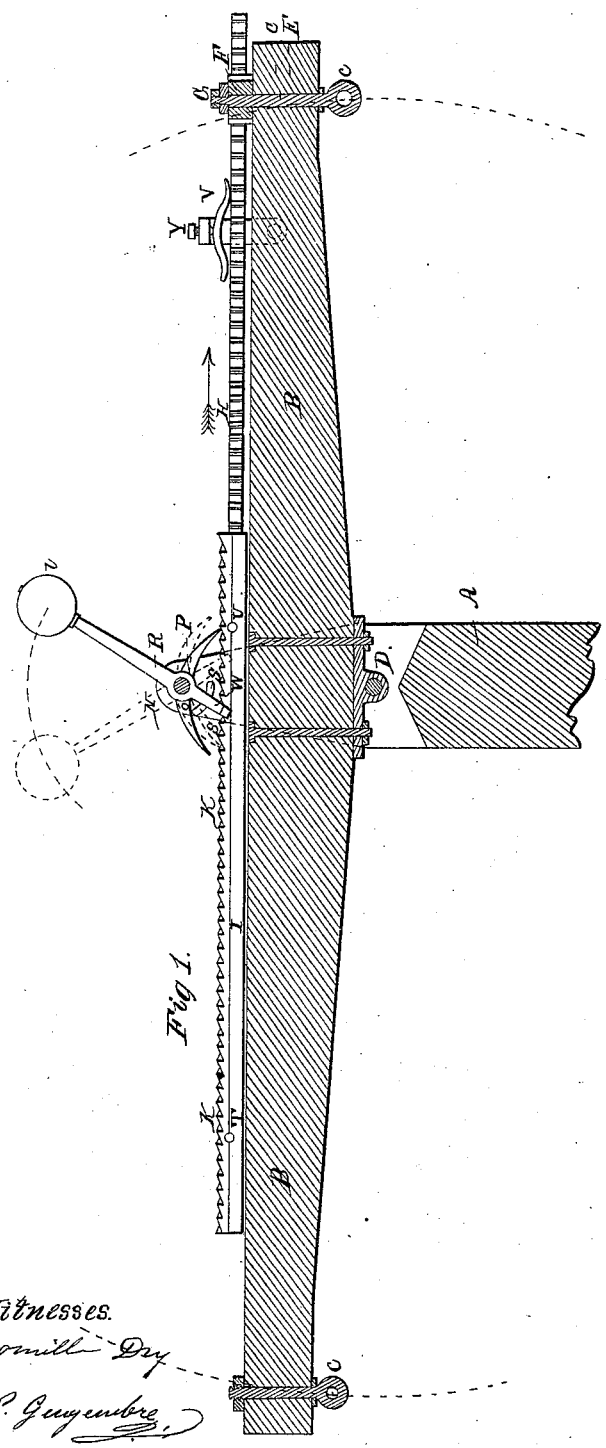
Figure 2:
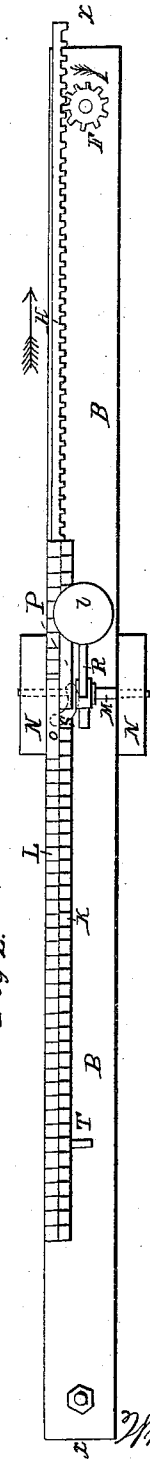

Figure 1 represents a sectional view of a working beam or lever of an ordinary boring apparatus, through the line $x\ x$, with my self-acting boring-tool turner attached; and Fig. 2 is a top view of the same.

My invention consists in a self-acting boringtool turner or boring-tool-turning apparatus, which can be applied at very little cost to any boring-riggings now put up and in use, and will replace the man employed in turning the boring-tools.

A is the samson-post. B is the working beam or lever. C is the joint where the power is applied to give to the lever B its rocking motion, and D is the pivot or center on which the lever B is balanced. So far this is all arranged in the ordinary manner.

E is a small shaft, having an eye, $e$, at the bottom, and a pinion, F, at the top. This pinion F is keyed or otherwise fastened on the shaft E, and over it there is a nut, G, or a key, to receive the strain and prevent the shaft E from slipping downward when the weight of the tools is hanging on the eye $e$.

H is a rack fitted in the pinion F and fastened to a bar, I, which is guided in suitable slides, so as to be able to travel lengthwise on the top of the working-beam B.

K and L are two racks, turned in opposite direction from each other, and also fastened to the bar I.

M is a small shaft or center-pin working in two holes bored in pieces N N, projecting above on each side of the samson-post A and the working-beam B.

O and P are two dogs having a free motion on the shaft M and fitting in the two racks K and L.

R is a lever, with counter-weight $r$, also hung on the shaft M. The lever R has a crescent-shaped catch, S S, which, according to the side which the lever R is thrown, will raise one or the other of the dogs O or P. (See Fig. 1.)

T and U are tappets or catches fastened into the bar I, which have for object to reverse the position of the lever R by coming in contact with its lower end, W, when the bar I is sliding on the beam B; and V is a spring pressed by the set-screw Y, for regulating the strain on the bar I and making it work steady.

The operation of my self-acting boring-tool turner is as follows: The apparatus being in the position represented by my drawings, as soon as the working-beam B is put in motion, the dog P will act on the rack K and cause the bar I to be pushed in the direction of the arrows, Figs. 1 and 2, and the rack H, by acting on the pinion F, will cause the shaft E and boring-tools hung to it on the eye $e$ to turn also in the direction of the arrow, Fig. 2, each movement of the working-beam B moving the tools round a certain quantity, always in the same direction, until they have turned five turns in that direction, when the tappet T will act on the end W of the lever R, throw it from the position which it occupies in the drawings to the position represented by the dotted line, Fig. 1.

The lever R, by changing its position, will lift the dog P up out of reach of the rack K, and will allow the dog O to fall freely and act on the rack L, and at once the bar I will begin to travel in the opposite direction to the arrows, which will cause the tools to be turned in an opposite direction to the one they have been turning until the other tappet, U, will touch the lever R, when it will again be thrown in the position represented in the drawings, and the motion of the tools will again be reversed, and so on alternately as long as the working-beam B is kept in motion.

What I claim, and desire to secure by Letters Patent of the United States, is—

1. The self-acting boring-tool-turning apparatus, applicable to any ordinary boring-rigging, composed of the pinion F, racks H, K, and L, dogs O and P, lever R, tappets T and U, and catches S S, combined with the lever B, and arranged as described, or their equivalent.

2. The two racks K L, oscillating with the beam B, in combination with the stationary shaft M, dogs P and O, lever R, catches S S, and tappets T and U, to obtain a self-acting go-and-come motion of the rack K and L on the beam B.

3. The spring V and set-screw Y, in combination with the bar I, for the purpose of regulating the motion of the said bar I on the bar B.

4. Turning boring-tools automatically by the action of the oscillating beam B itself, by means and with the use of the apparatus herein described, or its equivalent.

WM. B. TRUNICK. [L. S.]

Witnesses:
CAMILLE DEY,
H. P. GENGEMBRE.